(12) United States Patent
Goh et al.

(10) Patent No.: US 12,212,833 B2
(45) Date of Patent: Jan. 28, 2025

(54) INFORMATION HANDLING SYSTEM CAMERA SHUTTER WITH EXTERNAL FAIL SAFE

(71) Applicant: Dell Products L.P., Round Rock, TX (US)

(72) Inventors: Peng Lip Goh, Singapore (SG); Enoch Chen, Taipei (TW); Deeder M. Aurongzeb, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 129 days.

(21) Appl. No.: 18/093,467

(22) Filed: Jan. 5, 2023

(65) Prior Publication Data

US 2024/0236456 A1  Jul. 11, 2024

(51) Int. Cl.
   *H04N 5/335*   (2011.01)
   *H04N 23/55*   (2023.01)
   *H04N 23/57*   (2023.01)

(52) U.S. Cl.
   CPC ............ *H04N 23/55* (2023.01); *H04N 23/57* (2023.01)

(58) Field of Classification Search
   CPC .................................................. H04N 23/57
   See application file for complete search history.

(56) References Cited

U.S. PATENT DOCUMENTS

| | | |
|---|---|---|
| 9,465,276 B2 | 10/2016 | Jonsson et al. |
| 9,591,192 B2 | 3/2017 | Haddad |
| 9,829,669 B1 | 11/2017 | Leipold |
| 10,761,404 B2 | 9/2020 | Leimer |
| 10,931,922 B1 | 2/2021 | Brunson et al. |
| 11,294,260 B2 | 4/2022 | Park et al. |
| 11,994,787 B2 * | 5/2024 | Tan .................. H04N 23/55 |
| 2011/0182029 A1 * | 7/2011 | Wu ..................... G06F 1/1686 |
| | | 361/679.55 |
| 2015/0009399 A1 * | 1/2015 | Jonsson ............... G03B 11/041 |
| | | 348/373 |
| 2015/0059251 A1 * | 3/2015 | Rinner .................... G06F 21/83 |
| | | 49/465 |
| 2016/0161830 A1 * | 6/2016 | Gonzalez Sanchez ...................... G03B 11/043 |
| | | 396/448 |
| 2021/0127045 A1 * | 4/2021 | Clark ................... G03B 11/043 |
| 2021/0149272 A1 * | 5/2021 | Li ......................... H04N 23/55 |
| 2021/0208480 A1 * | 7/2021 | Choi .................... G06F 1/1686 |
| 2021/0271856 A1 | 9/2021 | Kanas et al. |
| 2021/0333686 A1 * | 10/2021 | Park ..................... G03B 11/041 |
| 2022/0269149 A1 | 8/2022 | Stone et al. |

* cited by examiner

*Primary Examiner* — Gary C Vieaux
(74) *Attorney, Agent, or Firm* — Zagorin Cave LLP; Robert W. Holland

(57) ABSTRACT

A portable information handling system camera module has a single shutter that slides in response to a single shutter mechanism to manage access for a field of view of both a visual camera and an infrared camera by sliding only between first and second positions, the first position aligning an opening of the shutter with a visual camera and a shield visual camera opening, the second position blocking the opening of the shutter and extending an end of the shutter over infrared camera. An external shutter actuator rests on the information handling system at the camera module and magnetically engages with the shutter to selectively block and expose the camera fields of view with an external manual input.

14 Claims, 21 Drawing Sheets

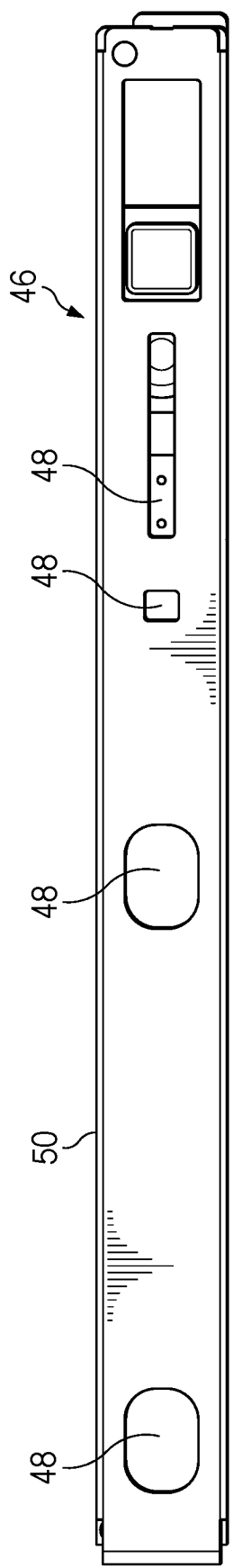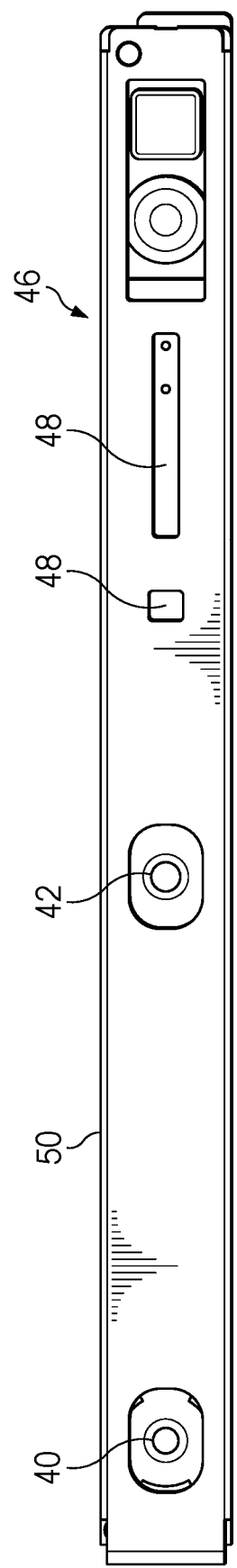
FIG. 3A
FIG. 3B

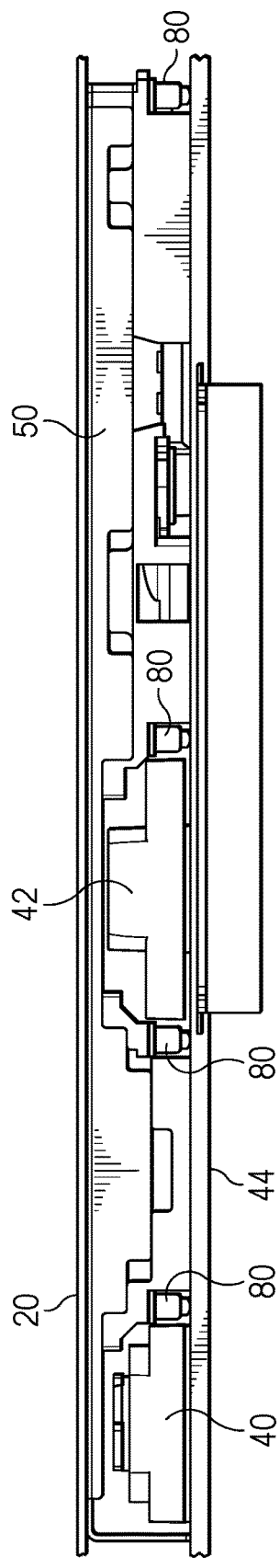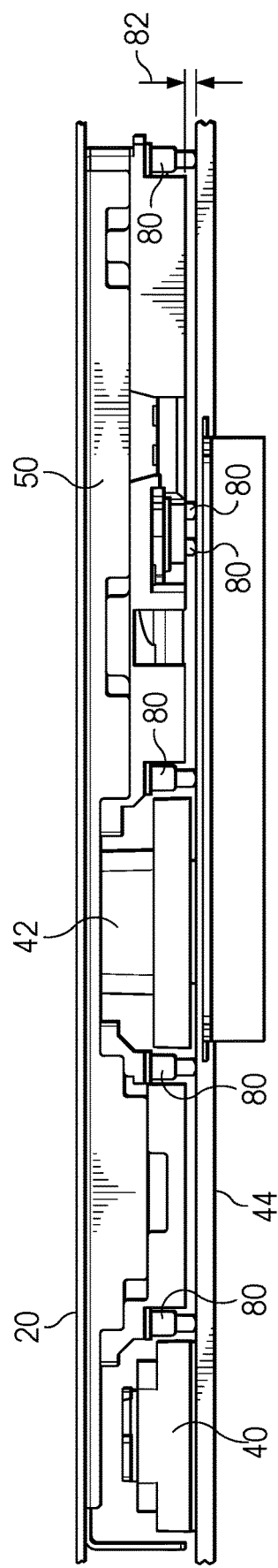

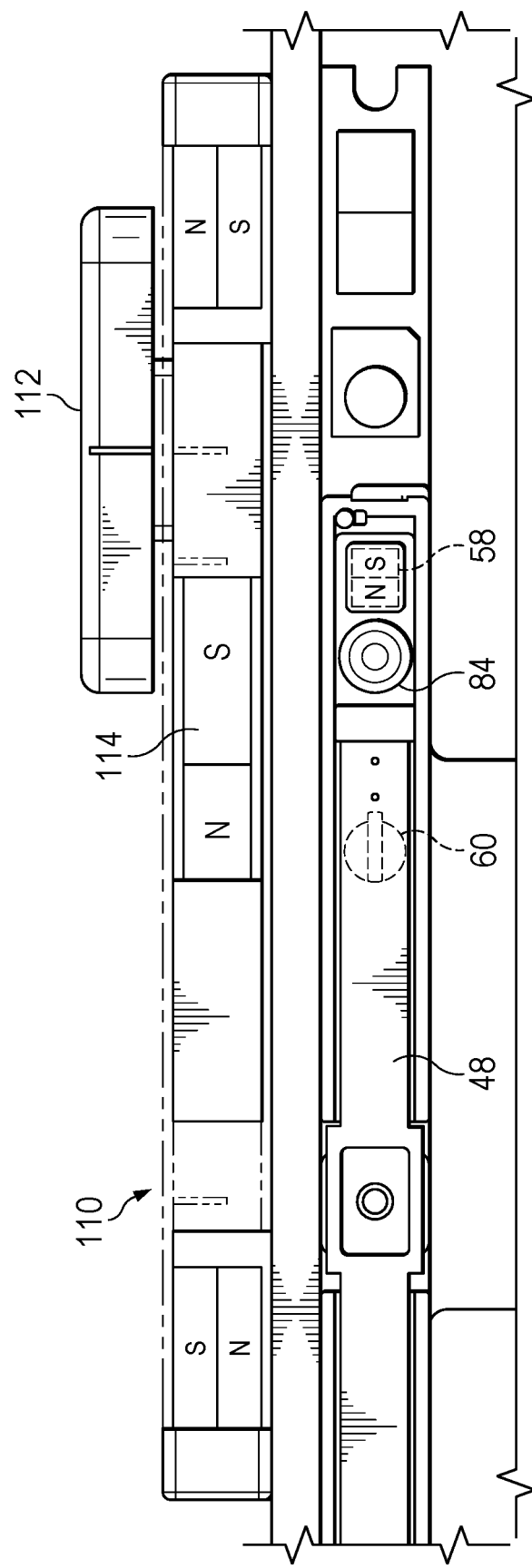

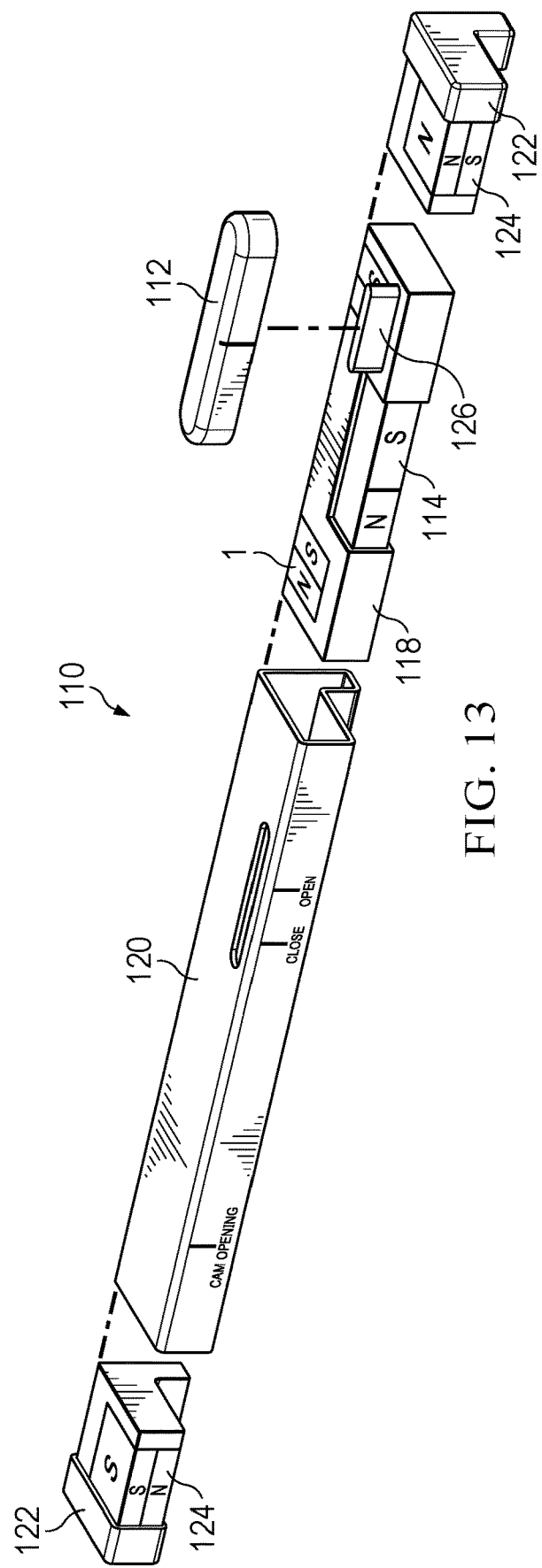

INFORMATION HANDLING SYSTEM CAMERA SHUTTER WITH EXTERNAL FAIL SAFE

BACKGROUND OF THE INVENTION

Field of the Invention

The present invention relates in general to the field of portable information handling systems, and more particularly to an information handling system camera shutter with external fail safe.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. For example, a main housing portion integrates processing components and a keyboard and rotationally couples with hinges to a lid housing portion that integrates a display. In clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility.

One increasingly common function of portable information handling systems is the execution of videoconference applications for end users who work remotely. Portable information handling systems typically include a camera integrated in the housing near the display that can capture images of an end user who is viewing the display, such as during execution of videoconference applications. One difficulty with the integration of a camera in a portable information handling system housing is that an unauthorized or user or malicious attacker who gets control of the camera can spy on the end user without the end user's knowledge. To warn an end user about camera use, cameras typically include an LED that illuminates when the camera is capturing images. A more reliable way to avoid unauthorized use of a camera is to block the camera lens when the camera is not in use so that it will not capture images. In some instances, information handling system cameras come with a mechanical shutter that slides over the camera when not in use.

More recently, many portable information handling systems also include an infrared camera that is used for user presence detection and capture of depth images, such as for facial recognition. In at least one information handling system, both the visual camera and the infrared camera are protected from unauthorized access by separate shutters. Each shutter has its out actuator so that the system can automatically uncover the camera when use is authorized. The use of dual shutters and dual shutter actuators tends to increase the cost and complexity of the system. This cost and complexity applies to every model size that uses the cameras as each has a different housing size and arrangement and different camera specification. However, if both shutters are not separately controlled, the use of one camera exposes the other camera to unauthorized access without a way to warn the end user. Although an LED may be illuminated, any light that has logic involved in its illumination may also be compromised. Further, integrating the shutter in an information handling system housing can make the camera unusable in the event of a shutter failure.

SUMMARY OF THE INVENTION

Therefore, a need has arisen for a system and method which opens and closes a shutter for both an infrared and visual camera with a single electromechanical actuator.

A further need exists for extending the shutter assembly across multiple platforms having cameras of different heights.

A further need exists for managing power at a visual camera when a shutter moves to an open position while only an infrared camera has an authorized use.

A further need exists for audible feedback of shutter position changes that does not rely on logic executing on a processing resource.

A further need exists for a manual actuation of a camera shutter that is enclosed within an information handling system housing.

In accordance with the present invention, a system and method are provided which substantially reduce the disadvantages and problems associated with previous methods and systems for including a shutter to protect access to a camera integrated in a portable information handling system housing. A camera module includes a shutter assembly that slides a shutter between open and closed positions with a single electromechanical actuator and a shutter plate that blocks and exposes both a visual camera and an infrared camera.

More specifically, a portable information handling system processes information with a processor that executes instructions and a memory that stores the information and instructions. A camera module is integrated in a housing of the portable information handling system, such as in a display lid portion under a display panel cover glass. The camera module has an infrared camera and a visual camera coupled to a circuit board and enclosed in a shutter assembly with an outer shield having an opening to expose each of the camera fields of view. The shield couples over a guide to capture a shutter that slides to expose and block the shutter shield openings and a shutter actuator with an electromechanical arrangement, such as first and second voice coil portions. The shutter actuator provides a single actuation between open and closed positions so that a single shutter plate selectively covers and exposes both of the shield openings. The shutter assembly adapts across plural platforms having cameras of different height with spring biased connectors that extend from the shutter assembly and against the camera module circuit board. When the shutter actuates for authorized use of an infrared camera without authorized use of a visual camera, the shutter assembly exposes both camera fields of view and cuts off power to the visual camera. A speaker cone in the shutter assembly has a base magnet that interacts with electromechanical actuator magnetic fields at shutter actuation to generate an audible sound. A manual shutter actuation device couples externally to the information handling system housing to support manual actuation of the shutter with external magnet sliding that interacts with the shutter assembly magnets.

The present invention provides a number of important technical advantages. One example of an important technical advantage is that a single electromechanical actuator, such as a voice coil actuator having electromagnetic attraction, moves a single shutter between just open and closed positions with respect to both a visual camera and an infrared camera aperture, providing a less complex and less costly security solution. When only one camera is authorized for use, the magnetic field of the shutter actuator is manipulated to turn power on and off at the unauthorized camera so that security is maintained. Thus a single shutter assembly supports the use of an infrared camera to perform user presence and related functions while shutting down the functionality of a visual camera. The camera module adapts to a variety of platforms and cameras of different heights by interfacing the shutter assembly with the circuit board with spring biased connectors, such as pogo pins, thereby reducing design and manufacturing costs. An inexpensive and mechanical speaker sound is generated by magnetic actuation to make an end user aware of camera shutter position changes.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 3A and 3B depict a front view of the camera module having the shutter in closed and open positions;

FIGS. 7A and 7B depict side cutaway views of the camera module having cameras of different heights and the shutter assembly adjusted to the different heights by the spring biased connectors;

FIGS. 12, 12A and 12B depict a manual override device to interact with magnets of the shutter from manual movement between open and closed positions; and FIG. 13 depicts an exploded perspective view of the manual override device configured to interact with the shutter assembly magnets.

DETAILED DESCRIPTION

A portable information handling system camera module includes a shutter assembly that blocks and opens an infrared camera and a visual camera field of view with movement between only first and second positions by a single electromagnetic actuator. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
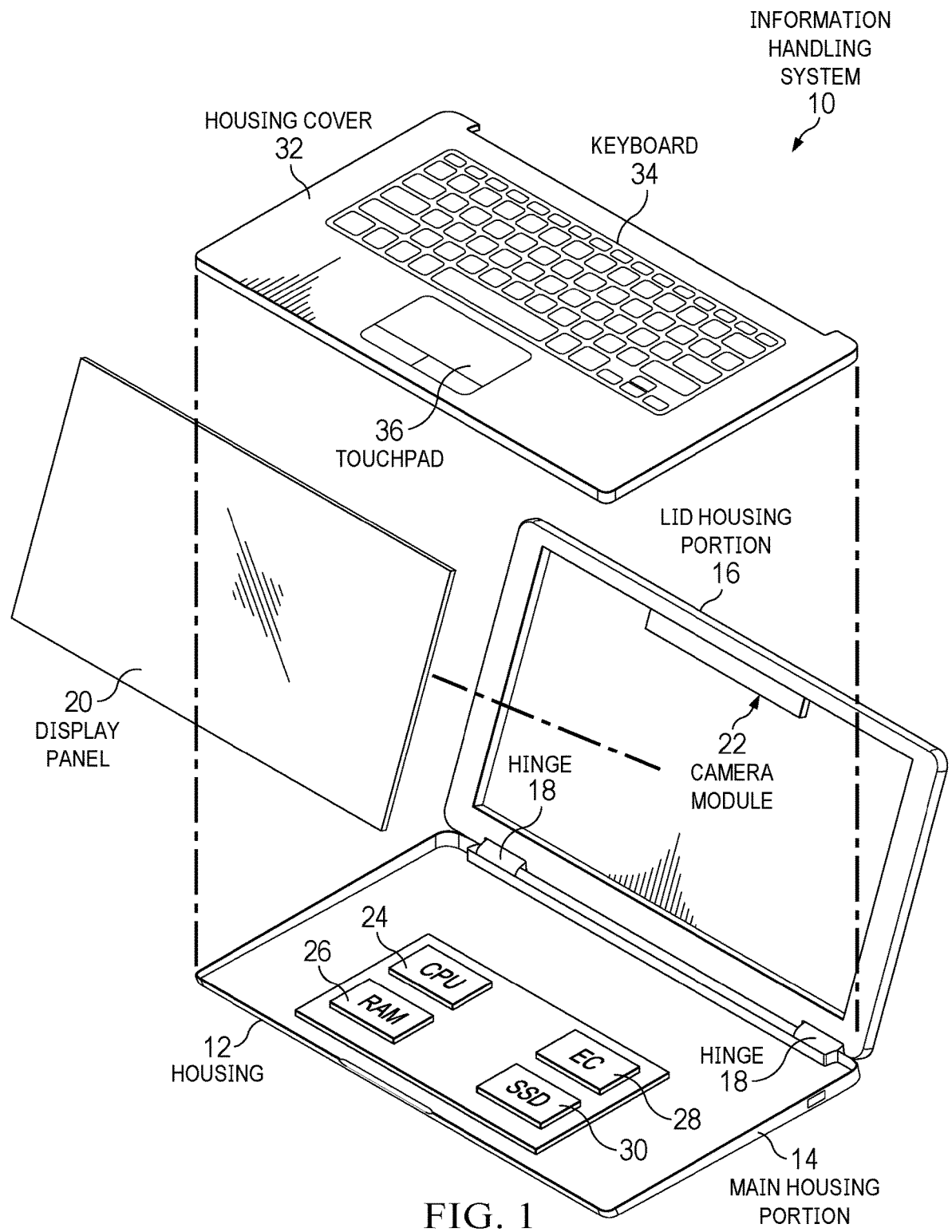
FIG. 1 depicts a block diagram of a portable information handling system having a camera module in a lid housing portion that includes a shutter assembly to secure the camera module from unauthorized use.

Referring now to FIG. 1, a block diagram depicts a portable information handling system 10 having a camera module 22 in a lid housing portion 16 that includes a shutter assembly to secure the camera module from unauthorized use. Information handling system 10 is built in a portable housing 12 having a main housing portion 14 rotationally coupled to a lid housing portion 16 by hinges 18 to rotate between a closed position and an open clamshell position. Main housing portion 14 contains processing components that cooperate to process information, such as a central processing unit (CPU) 24 that executes instructions and a random access memory (RAM) 26 that stores the instructions and information. An embedded controller (EC) 28 manages operating conditions of the system, such as power and thermal conditions within housing 12. A solid state drive (SSD) 30 includes non-transient memory that stores information during power down of information handling system 10, such as an operating system and applications. Lid housing portion 16 includes a display panel 20 that interfaces with CPU 24 to present information as visual images. A camera module 22 integrates in lid housing portion 16 to capture visual images, such as to support a videoconference application. In various embodiments, camera module 22 couples under a cover glass of display panel 20 or a bezel that couples around the perimeter of display panel 20. A housing cover 32 couples over main housing portion 14 and includes a keyboard 34 and a touchpad 36 that accept end user inputs that are communicated through embedded controller 28 to CPU 24. In alternative embodiments, other types of information handling systems may include camera module 22, such as all-in-one and tablet systems, as can a peripheral display that interfaces with a desktop information handling system through a display cable.

Camera module 22, as is described in greater detail below, includes both an infrared camera and a visual camera. The infrared camera detects infrared illumination, such as reflections of an infrared light source that are used for three dimensional images and time of flight user presence sensors. The visual camera includes an RGB sensor that captures images in the visual light spectrum. To provide security against unauthorized use of the infrared and visual cameras, camera module 22 includes a shutter that blocks the field of view of the infrared and visual camera when not being used by the system end user. The shutter may close automatically when no authorized applications are present, such as under control of the operating system through the embedded controller, and/or may be manually controlled by a user interface. To reduce the expense and complexity of the shutter, a single electromechanical shutter (EMS) arrangement is included to block and unblock both the infrared and visual camera. The shutter moves between only a first position that blocks both the infrared and visual cameras and a second position that exposes both the infrared and visual camera field of views. In some situations having only the infrared camera in use, such as for use presence detection, power is cutoff to the visual camera, such as with an automated command from the embedded controller or a manual end user selection. In various alternative embodiments, other shutter arrangements may be used that include multiple actuators and alternative arrangements of security features.

Figure 2:
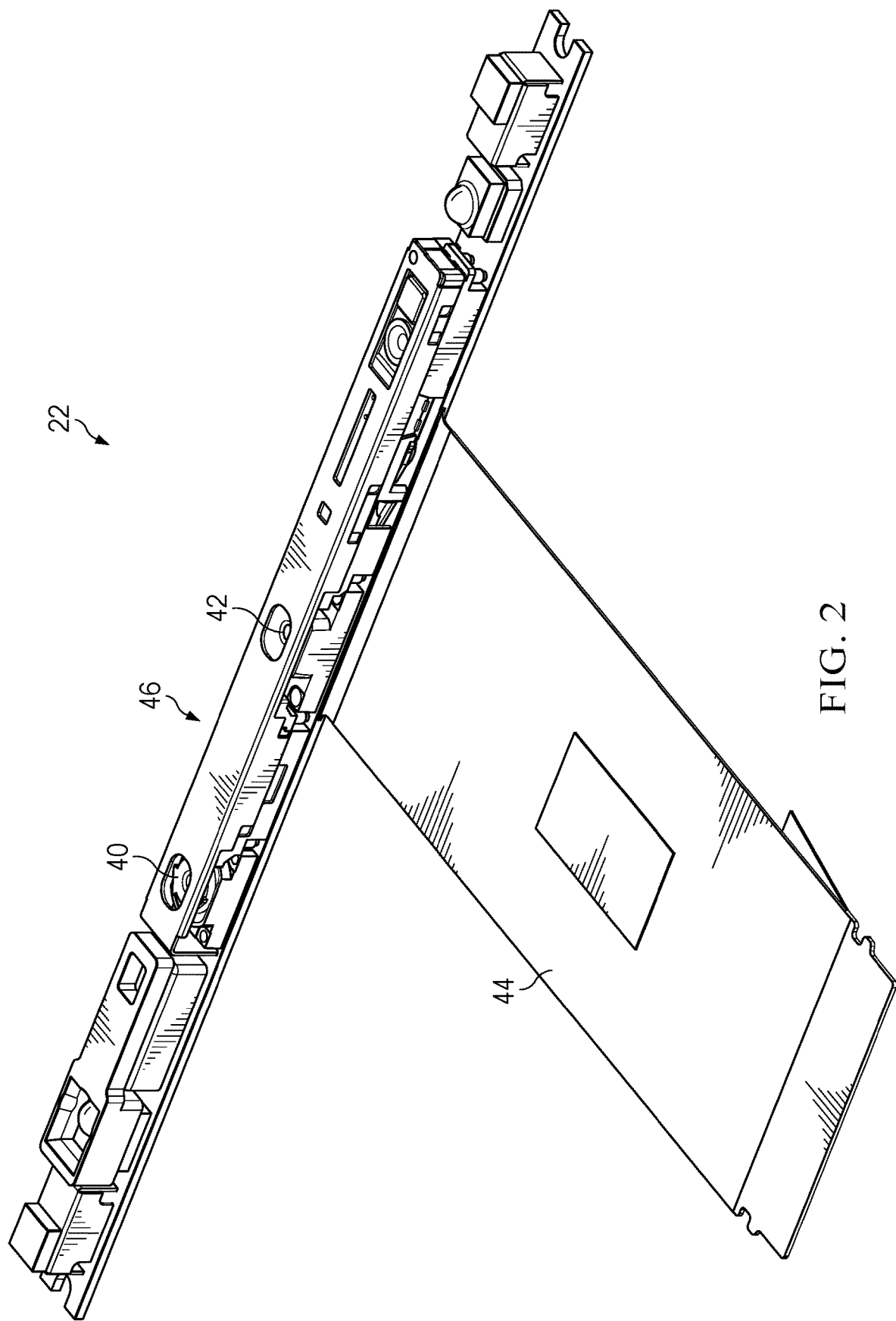
FIG. 2 depicts a perspective view of the camera module separate from the portable information handling system.

Referring now to FIG. 2, a perspective view depicts camera module 22 separate from portable information handling system 10. Camera module 22 has an infrared camera 40 and a visual camera 42 coupled to a printed circuit board 44 that interfaces with information handling system components through a connector that extends into the portable housing. In the example embodiment, printed circuit board 44 has a solid structure that supports the infrared and visual cameras and a flexible structure that extends out to terminate as a connector. Infrared camera 40 and visual camera 42 couple directly to printed circuit board 44 while shutter assembly 46 couples above printed circuit board 44 to actuate between open and closed positions. A shield exposed at the front face of shutter assembly 46 is fixed in position relative to circuit board 44 and has an opening over infrared camera 40 and visual camera 42 through which images are captured. As is described below in greater detail, a shutter between the shield and the cameras slides relative to the shield and the cameras to block and expose the camera fields of view.

Referring now to FIGS. 3A and 3B, a front view depicts camera module 22 having the shutter assembly 46 in closed and open positions. A shutter shield 50 is exposed at an outer surface that may be an external surface of an information handling system or may be disposed under a cover glass. Shutter shield 50 remains stationary relative to the cameras. A shutter 48 slides within shutter assembly 46 to block and exposed the field of view of infrared camera 40 and visual camera 42. FIG. 3A depicts shutter 48 slid within shutter shield 50 to a closed position that blocks both openings of shutter shield 50. FIG. 3B depicts shutter 48 slid within shutter shield 50 to an open position that exposes infrared camera 40 and visual camera 42 through the openings of shutter shield 50. In the example embodiment, a single shutter and single shutter actuator provide both the open and closed position.

Figure 4:
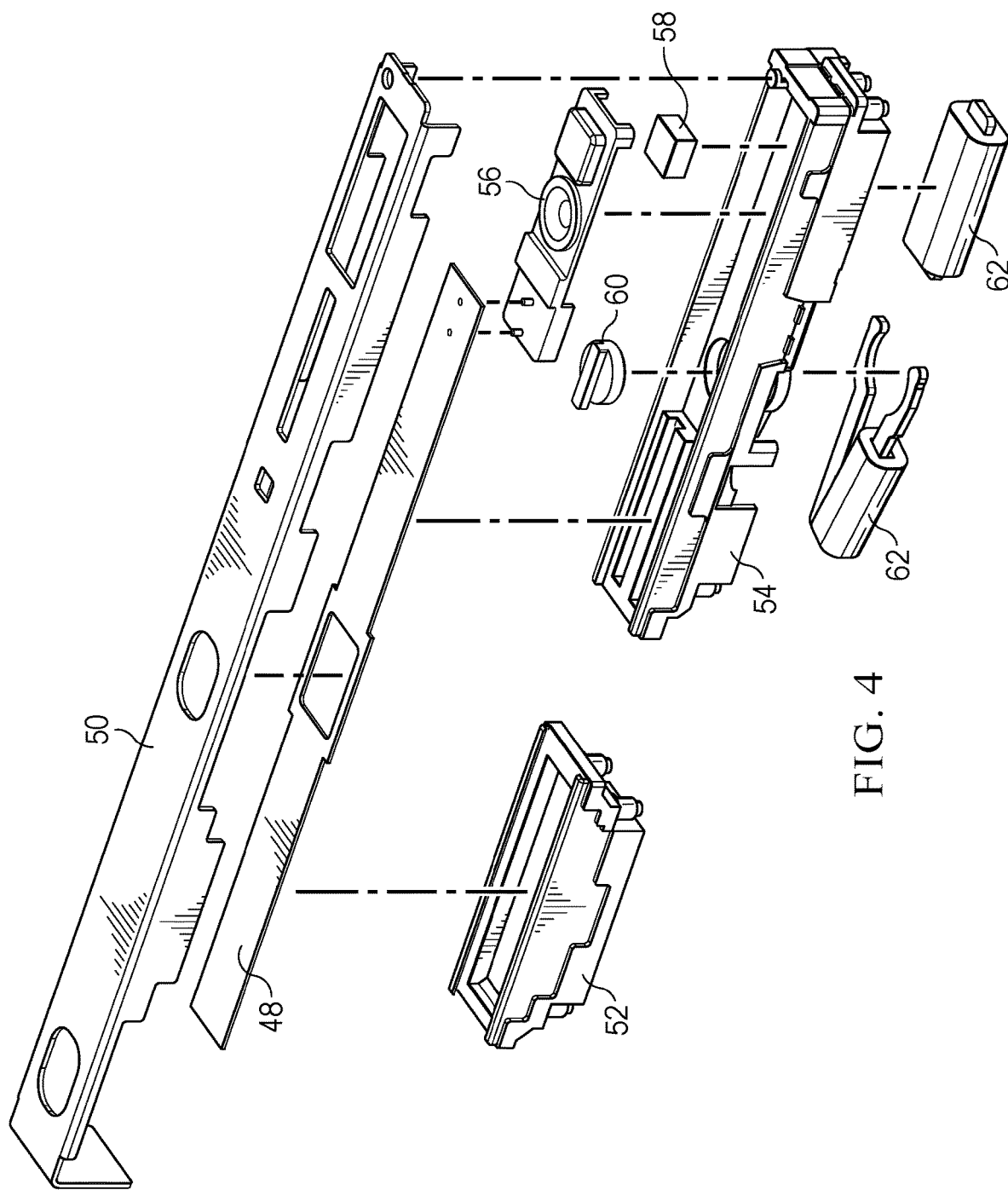
FIG. 4 depicts an exploded perspective view of a shutter assembly having a single shutter actuator to move a shutter between open and closed positions.

Referring now to FIG. 4, an exploded perspective view depicts a shutter assembly having a single shutter actuator to move a shutter between open and closed positions. In the example embodiment, shutter shield 50 is recycled stamped steel material that couples over a first guide portion 52 and second guide portion 54 that assemble around the visual camera to define a guide in which shutter 48 fits and slides. Shutter 48 is a recycled stamped steel piece that has a central opening that slides into and out of alignment with a visual camera mounted to a circuit board between first and second shutter guide portions 52 and 54. A shutter slider 56 couples to second guide portion 54 in a sliding relationship and has a set of pegs at one end that fit into openings of shutter 48. When shutter slider 56 slides within the guide formed by second guide portion 54, shutter 48 slides in both first guide portion 52 and second guide portion 54 spanning across a central open area where the visual camera is located. Shutter slider 56 is motivated to slide by magnetic fields generated with an electromechanical actuator 62, such as a voice coil actuator. Electromechanical actuator 62 interacts with a shutter slider magnet 58 to use an attracting and repulsing magnetic force to move shutter slider 56. For instance, the opposing elements of electromechanical actuator 62 each receive a current to generate opposing magnetic fields. A like magnetic field repulses shutter slider magnet 58 and an opposite magnetic field attracts shutter slider magnet 58. A rotating magnet 60 couples in a fixed location of second guide portion 54 aligned with the arms extending out of electromagnetic actuator 62 to change rotational orientation based upon the magnetic field generated in the arms. As is described below in greater detail, a member on the top side of rotating magnet 60 interacts with shutter slider 56 to block and allow sliding movement. In the example embodiment, electromagnetic actuator 62 may rotate rotating magnet 60 by creating a magnetic field at only one portion so that shutter slider 56 does not move. In one alternative embodiment, electromagnetic actuator 62 may have one electromagnetic and one permanent magnet. In the example embodiment, shutter shield 50 couples directly to first guide portion 52 and second guide portion 54 so that additional structural integrity is provided to strengthen the shutter assembly and avoid bending or warpage of shutter shield 50 during assembly, usage and in the event of shocks, such as dropping.

Figure 5:
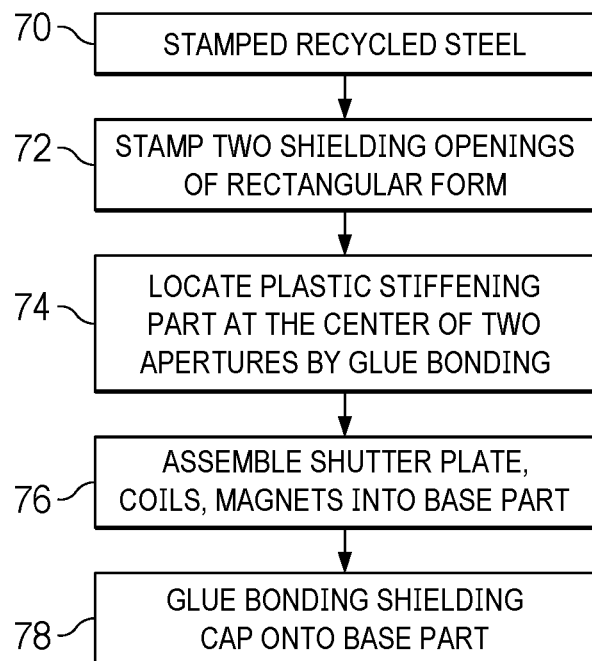
FIG. 5 depicts a flow diagram of a process for manufacture of a shutter assembly having a single electromagnetic actuator.

Referring now to FIG. 5, a flow diagram depicts a process for manufacture of a shutter assembly having a single electromagnetic actuator. At step 70, recycled steel sheets are stamped to create the shutter and shutter shield. At step 72 the infrared and visual camera openings are stamped in the shutter shield. Although alternative materials may be used, the support provided below by the guide helps to encourage the use of recycled materials. At step 74, the plastic stiffening guide portions are located on the circuit board to center the cameras on the openings defined by the assembly. At step 76 the shutter plate is inserted in the guide along with the electromagnetic actuator and magnets. At step 78, the shutter shield is glue bonded in place over the shutter plate and the guides to hold the assembly together. The camera module may then be assembled into an information handling system. As is described in greater detail below, in one embodiment the shutter assembly is completed to have spring biased connectors extending from the bottom side to interface with the circuit board. This arrangement allows the shutter assembly to adapt to cameras coupled to a circuit board that have a variety of height profiles.

Figure 6:
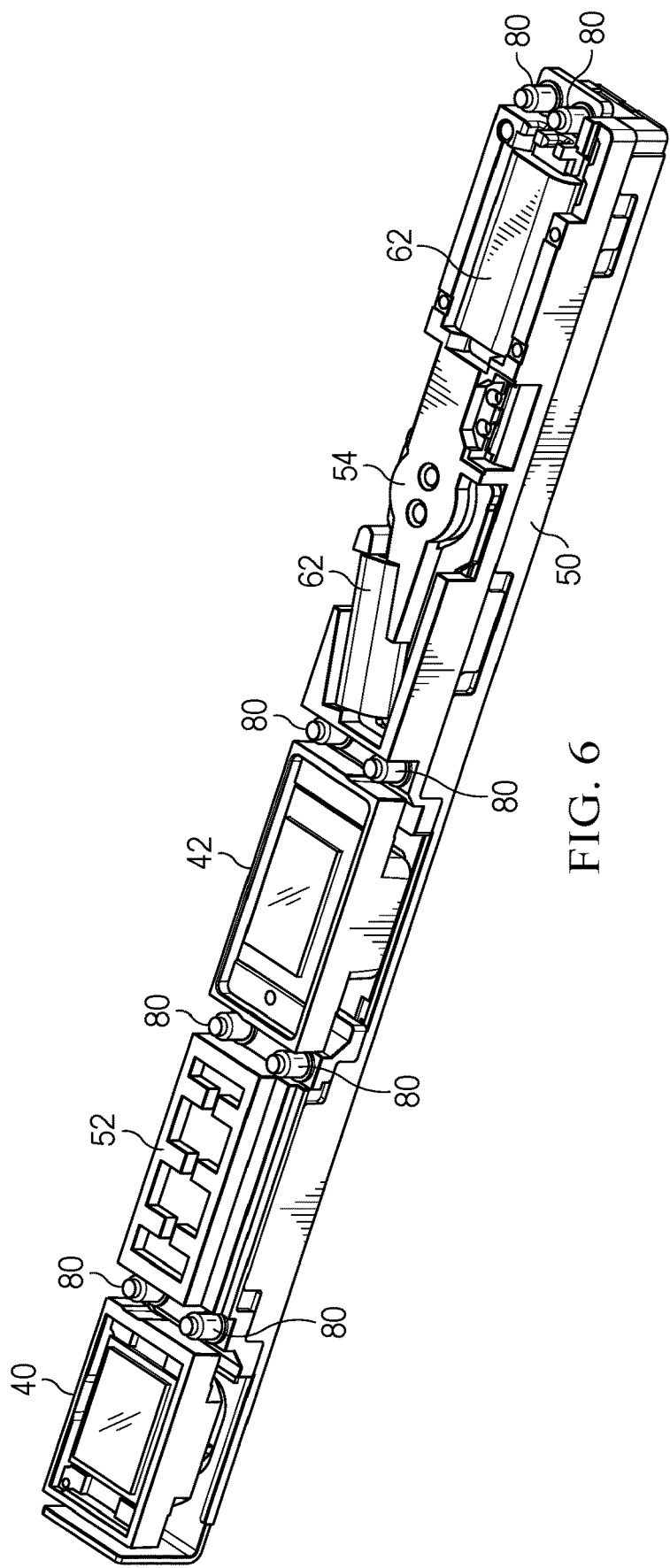
FIG. 6 depicts a bottom perspective view of the camera module spring biased connectors that extend down against the camera circuit board and support the shutter assembly at different configurable heights.

Referring now to FIG. 6, a bottom perspective view of the camera module depicts spring biased connectors 80 that extend down against the camera circuit board and support the shutter assembly at different configurable heights. In the example embodiment, the camera module is depicted with the base circuit board removed so that the infrared camera 40 and the visual camera 42 are in position within the first guide portion 52 and second guide portion 54. Shutter shield 50 couples over the cameras with openings aligned to the camera fields of view and contains the shutter plate captured within the guide to selectively block and expose the cameras to their external fields of view. An electromagnetic actuator 62 interfaces with the circuit board through spring biased connectors 80 to receive power that generates the magnetic field to actuate the shutter plate between open and closed positions. For example, the spring biased connectors are pogo pins that press down from a fixed coupling location on the guide. In the example embodiment, some of the spring biased connectors may be present only to support the shutter assembly in an elevated position above the circuit board and may not have an electrical interface.

Referring now to FIGS. 7A and 7B, a side cutaway view depicts the camera module having cameras of different heights and the shutter assembly adjusted to the different heights by the spring biased connectors. FIG. 7A depicts a first example embodiment having an infrared camera 40 and a visual camera 42 with a height of less than the height of shutter shield 50 resting on first guide portion 52 and second guide portion 54. In the example embodiment, spring biased connectors 80 compress to a minimal extension and a gap exists between shutter shield 50 and the camera top surfaces. FIG. 7B depicts a second example embodiment having an infrared camera 40 and visual camera 42 with a height of greater than the height of shutter shield 50 resting on first guide portion 52 and second guide portion 54. In the example embodiment, spring biased connectors 80 extend downward from the guide to interface with circuit board 44 with a gap 82 defined between the bottom side of the guide and circuit board 44. The spring biased connectors 80, pogo pins in the example embodiment, provide electrical contact to power the electromagnetic actuator, support the entire shutter assembly above the circuit board and adapt the camera module to couple the shutter assembly with cameras having different heights. For example, when the cameras are more tall, the spring biased connectors will lift the entire shutter assembly higher to clear the camera height so that the camera module adapts to fit any type of camera without a redesign.

Figure 8:
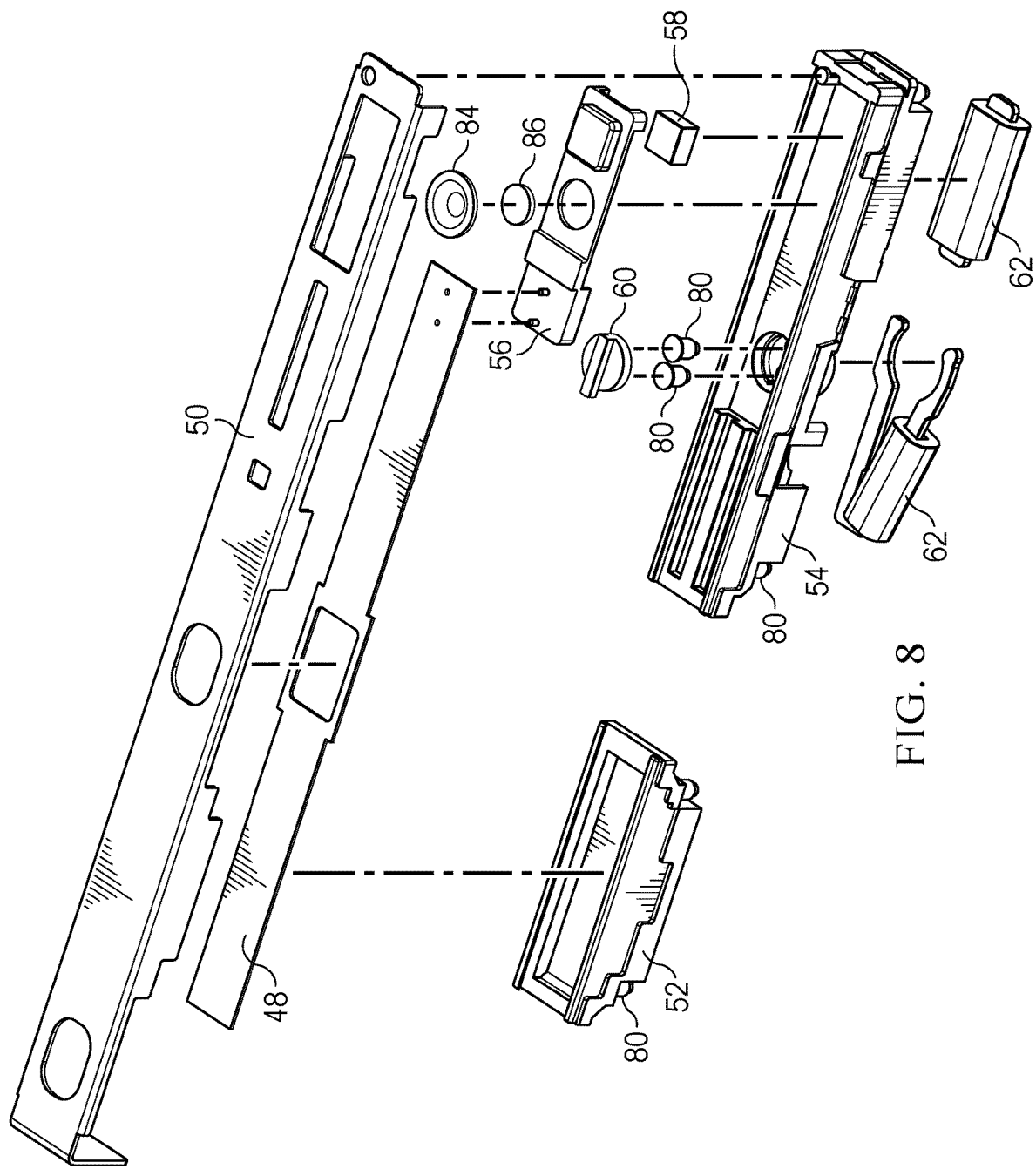
FIG. 8 depicts an exploded upper perspective view of the shutter assembly having spring biased connectors to selectively control power to a visual camera when the shutter is in an open position.

Referring now to FIG. 8, an exploded upper perspective view depicts the shutter assembly having spring biased connectors to selectively control power to a visual camera when the shutter is in an open position. Spring biased connectors 80 extend from the bottom of first guide portion 52 and second guide portion 54 to provide power to electromagnetic actuator 62 as described above. In addition, first and second of the spring biased connectors 80 interface through rotational magnet 60 to define a circuit that accepts power from the camera circuit board and then routes the power back to the circuit board. Electromechanical actuator 62 rotates rotating magnet 60 by generating north and south magnetic fields to interact with the permanent magnetic field of rotating magnet 60. Contacts on the bottom side of rotating magnet 60 interface with spring biased connectors 80 in one orientation and disconnect in another. In the example embodiment, power for the visual camera is routed through the rotating magnet to allow control by the electromagnetic actuator of the application of power to the visual camera with the shutter in an open position, such as when an authorized application executing on an information handling system only needs to use the infrared camera. Shutter slider 56 includes a speaker 84 having a speaker magnet 86 that slides with the shutter slider 56 and shutter 48, such as based upon generation of a magnetic field by electromagnetic actuator 62 that operates on shutter slider magnet 58. As speaker 84 slides past rotating magnet 60, the interaction with speaker magnet 86 creates an audible clicking sound as feedback to an end user of shutter actuation.

Figure 9:
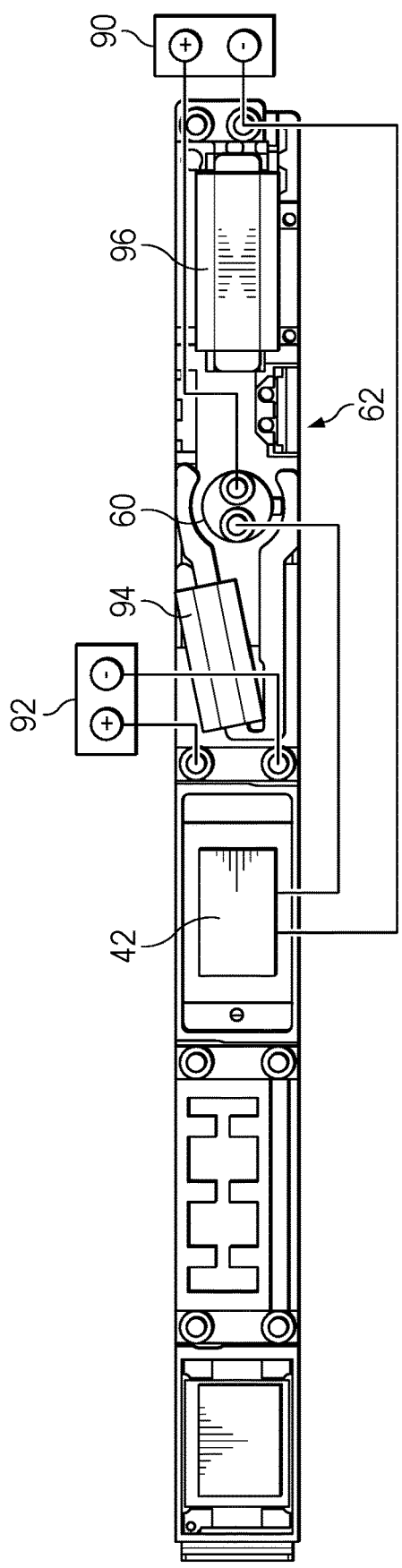
FIGS. 9 and 9A through 9F depict an example of control of power to a visual camera by rotational movement of a rotating magnet with application of a magnetic field by the electromagnetic actuator.
Figure 9A:
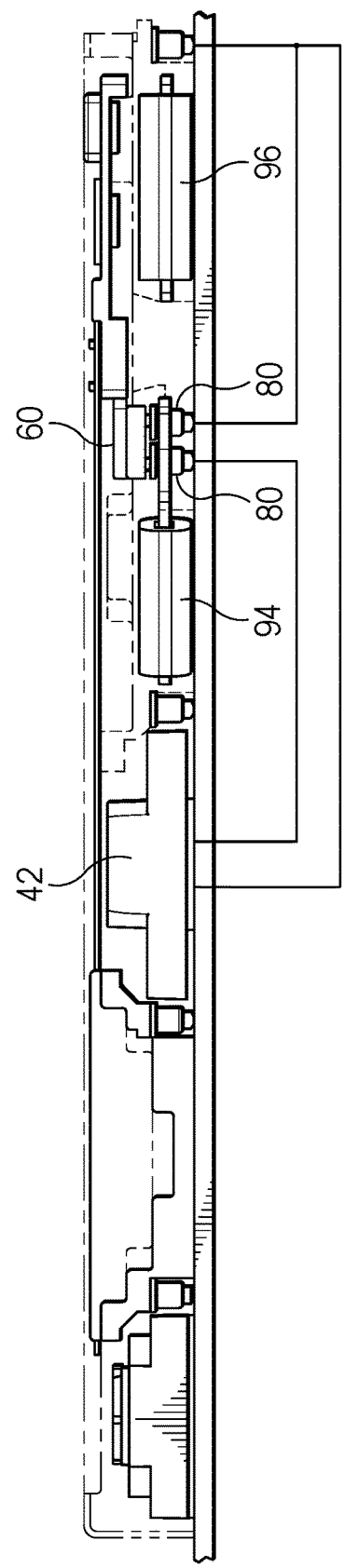
Figure 9B:
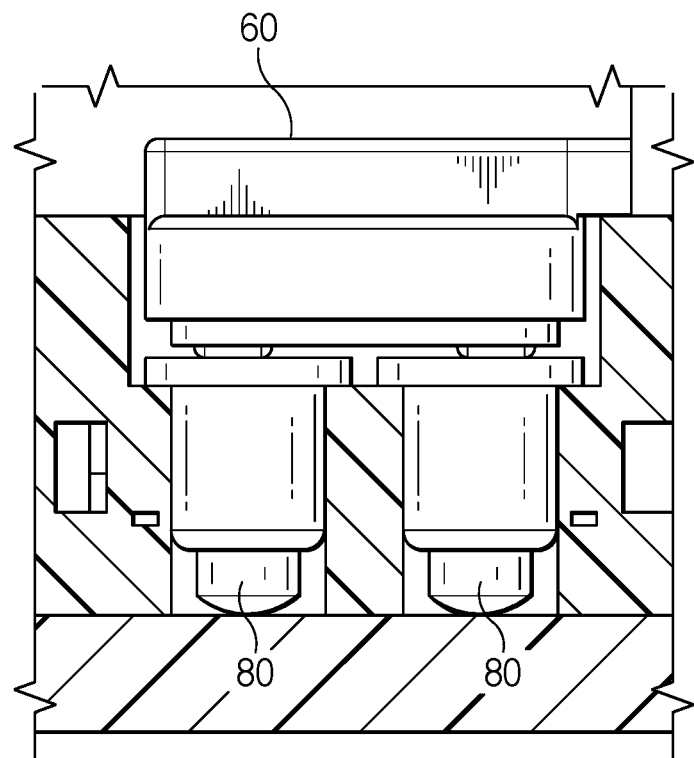
Figure 9C:
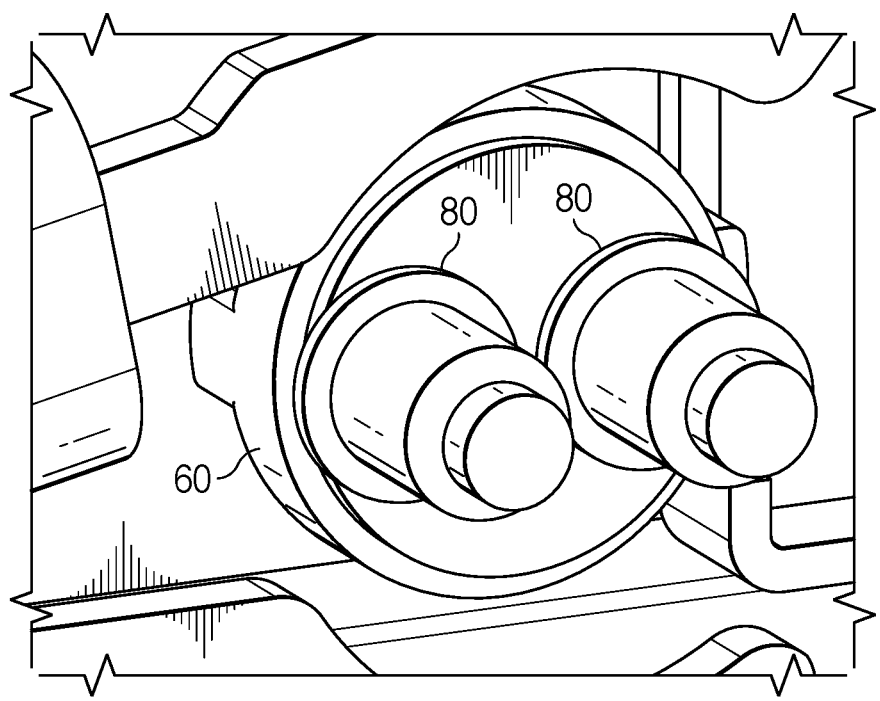
Figure 9D:
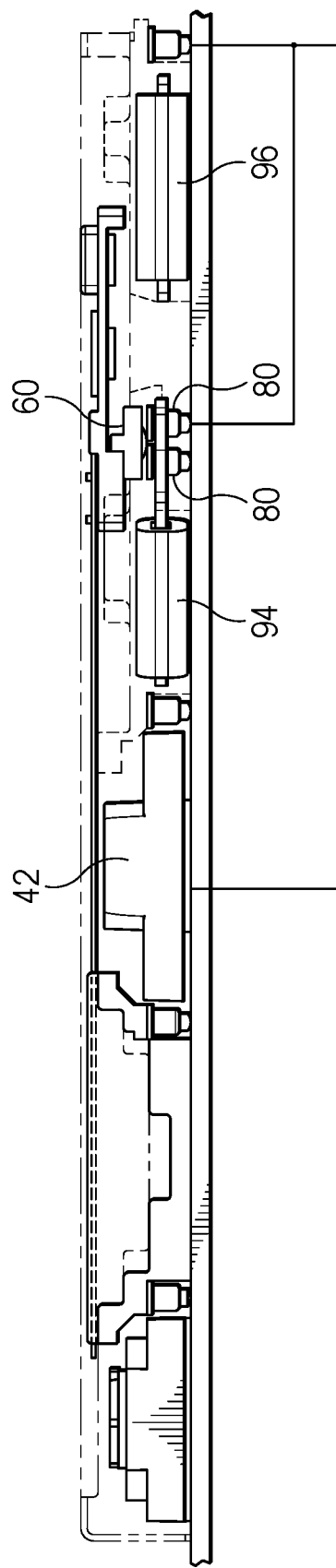
Figure 9E:
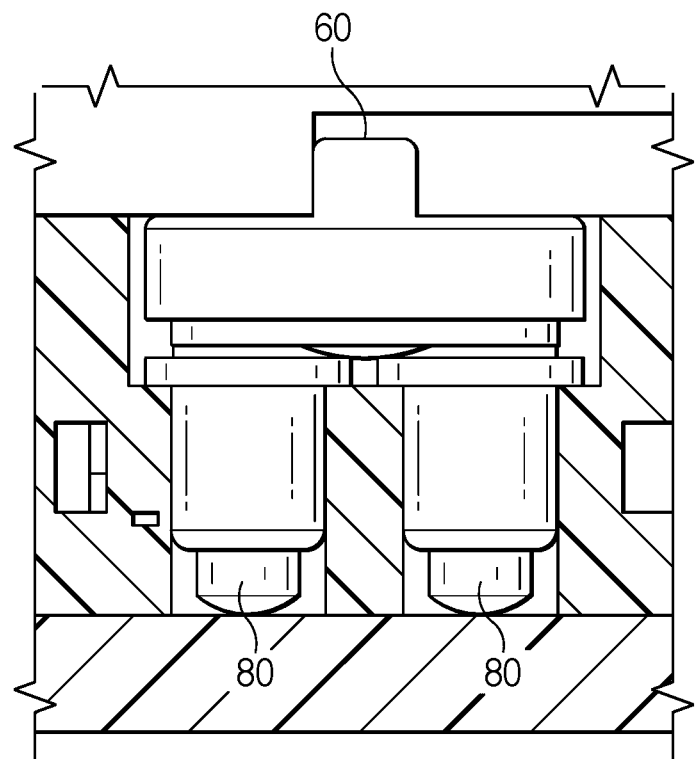
Figure 9F:
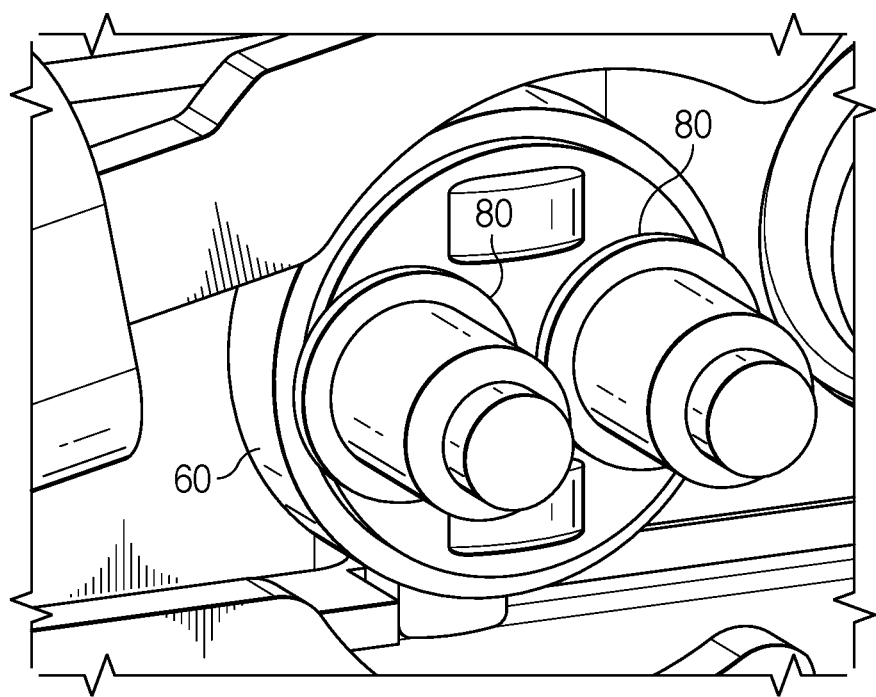

Referring now to FIGS. 9 and 9A through 9F, an example depicts control of power to a visual camera by rotational movement of a rotating magnet with application of a magnetic field by the electromagnetic actuator. FIG. 9 depicts a bottom view of the camera module with the circuit board removed. A first pair of connectors 90 provide power and ground from the circuit board to a first voice coil actuator portion 96 and to rotating magnet 60. A second pair of connectors 92 provide power and ground from the circuit board to a second voice coil actuator portion 94. At rotating magnet 60 power routes through connector pads and the spring biased connectors to visual camera 42 so that rotation of rotating magnet 60 will break the power connection and cut off power to visual camera 42. FIGS. 9A, 9B and 9C depict rotating magnet 60 in a rotational orientation so that spring biased connectors 80 engage against the contact pads of the rotating magnet to pass current. With the power circuit closed, visual camera 42 receives power and ground to operate normally. FIGS. 9D, 9E and 9F depict rotating magnet 60 in a rotational orientation so that spring biased connectors 80 disconnect from against the contact pads so that current does not pass through the rotating magnet. When the circuit is open, power is removed from visual camera 42 so that it will not operate normally. In one embodiment, when the electromagnetic actuator slides the shutter closed, the magnetic field to accomplish closing of the shutter also powers off the visual camera. When the shutter opens, the magnetic field to accomplish opening of the shutter also powers on the visual camera. When the shutter is in the open position and only the infrared camera is authorized for use, like magnetic fields on both portions of the voice coil biases the shutter to the open position while also rotating the magnet to power down the visual camera. In alternative embodiments, alternative arrangements may be used to power off the visual camera when the shutter is open so that unauthorized use is prevented, such as manual switch that disconnects power or actuates the magnetic fields to disconnect power.

Figure 10A:
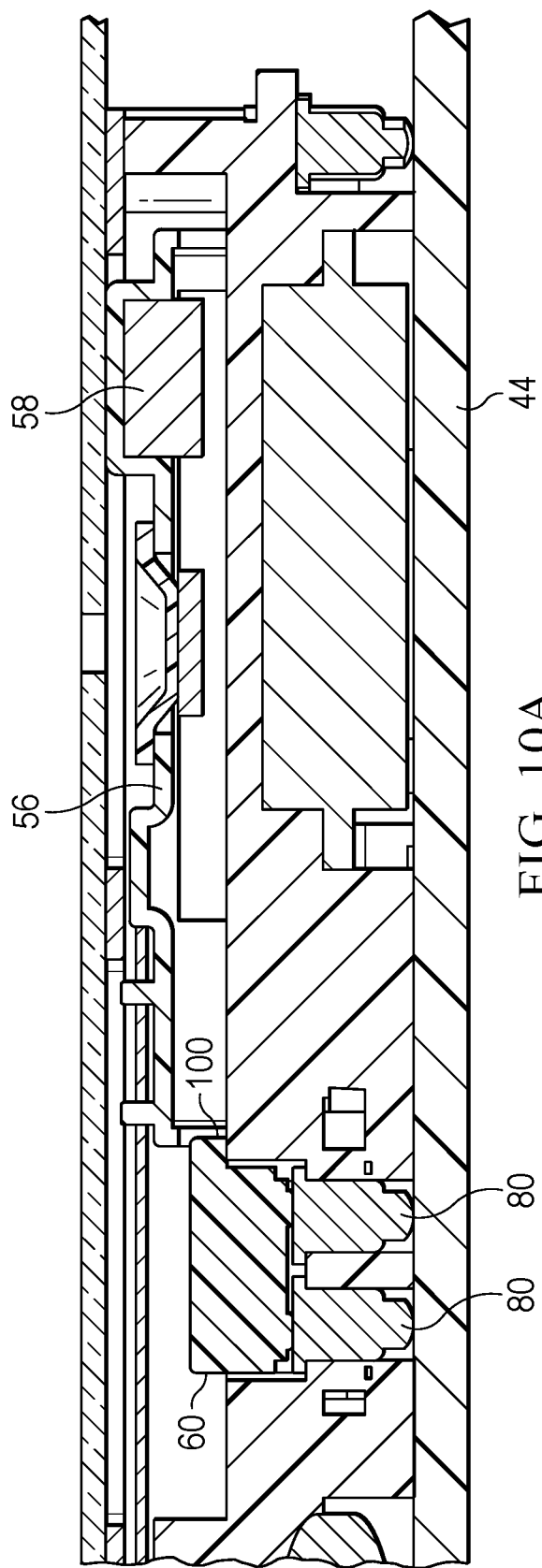
FIGS. 10A through 10D depict an example of use of the rotational magnet as a stopper that manages shutter open and closed positions.
Figure 10B:
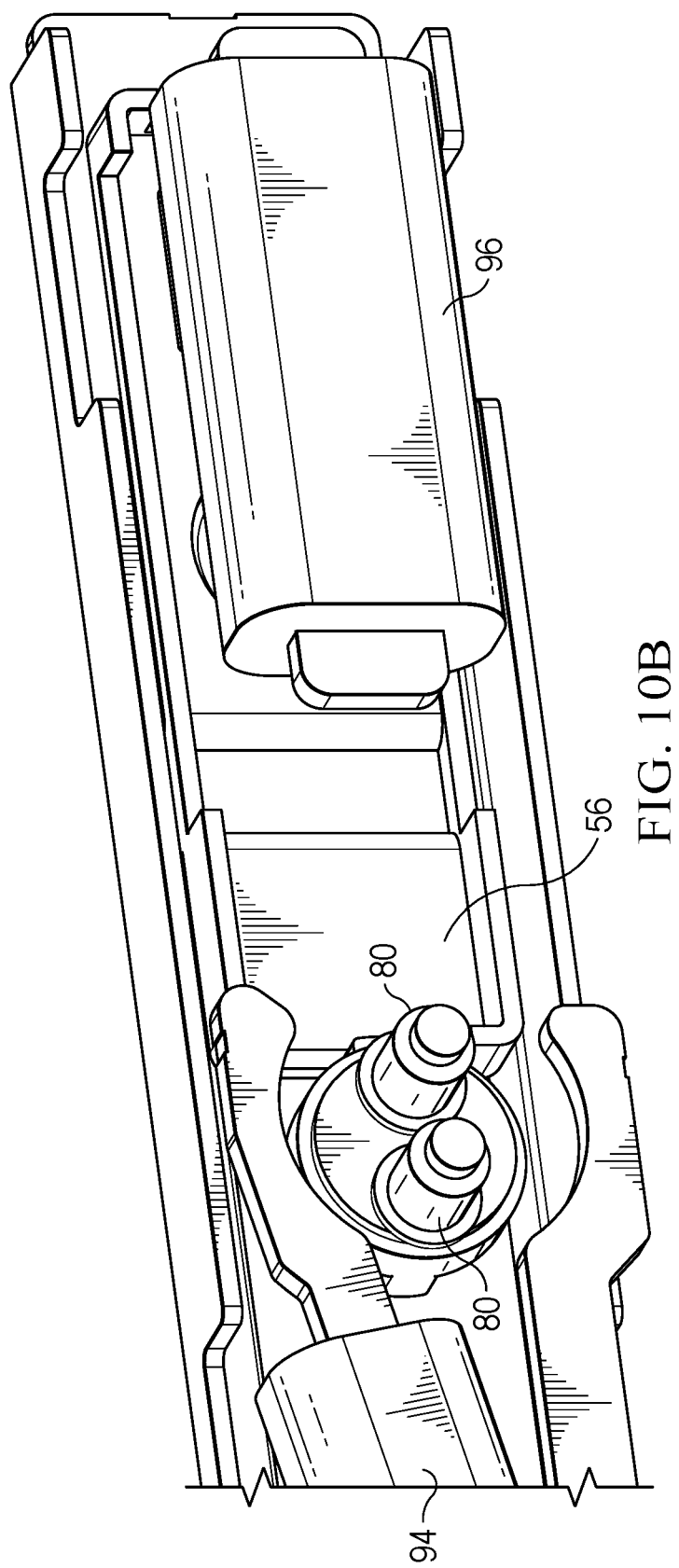
Figure 10C:
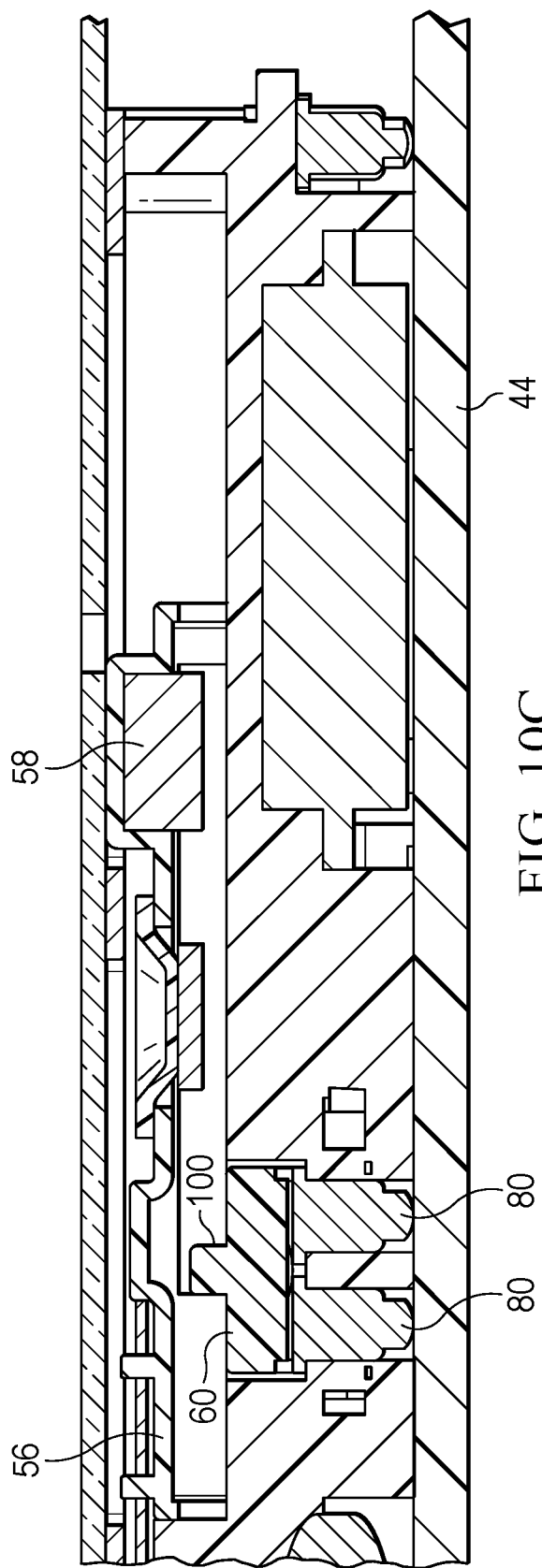
Figure 10D:
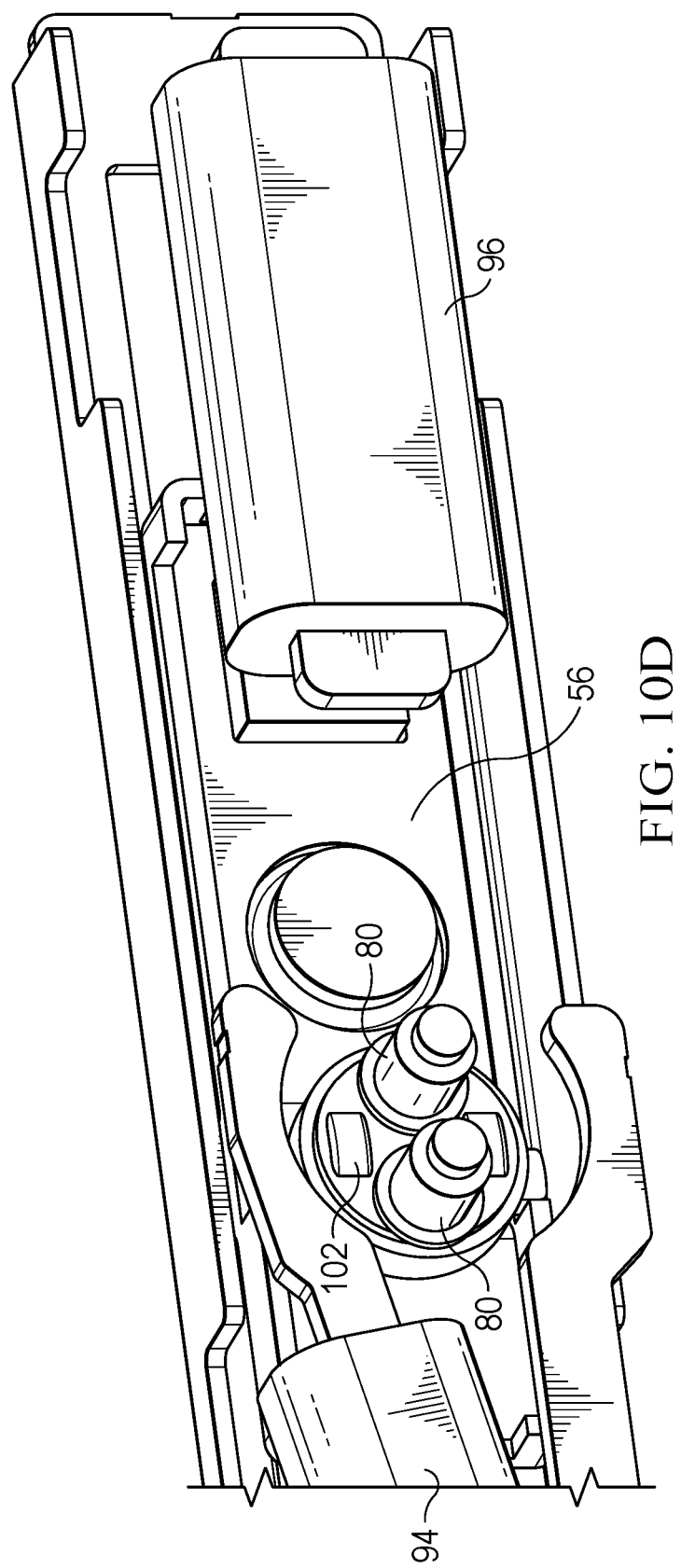

Referring now to FIGS. 10A through 10D, an example depicts use of the rotational magnet as a stopper that manages shutter open and closed positions. Rotational magnet 60 includes a member 100 that extends above and to one side of the magnet circumference that acts to obstruct movement of shutter slider 56 in one rotational orientation and allows sliding movement of shutter slider in another rotational orientation. In various embodiments, the member may stop sliding movement of shutter slider 56 when the shutter is in an open position and/or a closed position. In the example embodiment, magnetic fields of the electromagnetic actuator and the rotational magnet cooperate to unlock the shutter when actuation occurs to an open position and lock the shutter when actuation occurs to a closed position. The rotational orientation also aligns with application of power to the visual camera when the shutter actuates to the open position. FIG. 10A depicts a side sectional view of the camera module with the shutter slid to an open position by shutter slider 56 pulled right with interaction of magnet 58 and the magnetic field of the electromagnetic actuator. Member 100 of rotational magnet 60 aligns with the sliding axis of shutter slider 56 to allow a sliding movement. In one embodiment, shutter slider 56 may include a guide to allow member 100 to pass and to engage member 100 if rotated to the locked position. FIG. 10B depicts a bottom view showing voice coil portion 94 having arms disposed around rotational magnet 60 to generate a magnetic field that rotates the magnet and pushes magnet 58 of shutter slider 56 away and towards the unlocked position, with voice coil portion 96 attracting magnet 58. FIG. 10C depicts a side sectional view of the camera module with the shutter actuated to the locked position by the electromagnetic actuator. The magnetic field applied to close the shutter also operates to rotate rotational magnet 60 orthogonal the sliding axis and engage the member 100 against shutter slider 56 so that the shutter is held in the closed position. FIG. 10D depicts a bottom view of the shutter assembly to illustrate that rotation of rotational magnet 60 moves raised contact portions 102 out of alignment with spring biased contacts 80 to cut off current from flowing through rotational magnet 60.

Figure 11:
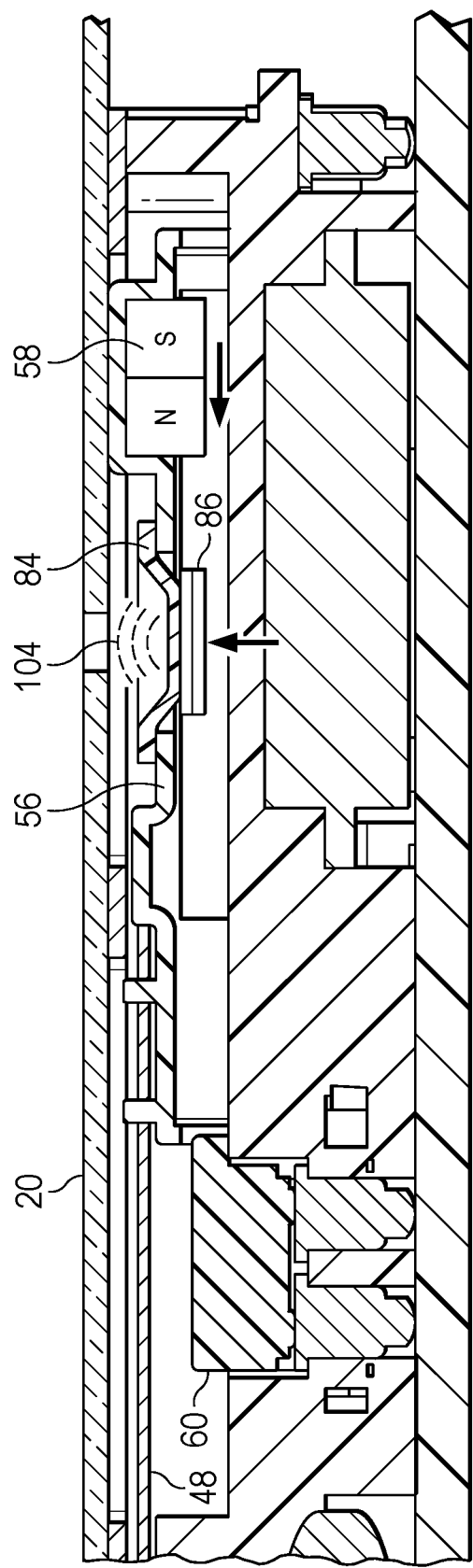
FIG. 11 depicts a side sectional view of the camera module as an example embodiment having audio feedback by a speaker interaction with a magnetic field during movement of the shutter.

Referring now to FIG. 11, a side sectional view depicts the camera module as an example embodiment having audio feedback by a speaker interaction with a magnetic field during movement of the shutter. In the example embodiment, speaker 84 has a cone of polypropylene or similar material and a speaker magnet 86 integrated to slide with shutter slider 56. Activation of the electromechanical actuator acts on magnet 58 to induce a sliding motion that is translated to the shutter 48. Speaker 84 is exposed at an outer side of shutter slider 56 to output audible sounds 104 at the display panel 20 outer glass surface. In the example embodiment, the same magnetic field that operates to slide shutter slider 56 also operates to push or pull speaker magnet 86 of speaker 84 so that an audible sound is output as the movement of speaker magnet 86 is translated against the speaker material. For example, an audible click sound is generated by speaker 84 at each activation of the second voice coil portion, either by repelling or attracting the speaker magnet 86 to move air in the speaker cone and thereby generate an audible sound. This audible feedback offers an end user notice of the movement of the shutter to confirm that camera use is in fact desired by the end user.

In one example embodiment, the speaker magnet and speaker have a neutral position so that pushes on the speaker magnet will generate audible sounds while pulls on the speaker magnet will have a minimal speaker cone movement that generates little audible sound. In such an example embodiment, audible sound may be generated by closing of the shutter but not opening, or alternatively by opening of the shutter but not close. In such an embodiment, when only the first voice coil portion is activated to rotate the rotational magnet, sound may not be produced by the speaker. In the example embodiment, sound is generated by application of a magnetic field by the electromagnet that corresponds to a command from the circuit board to open or close the shutter. In an alternative embodiment, sound may be generated by movement of the shutter relative to a permanent magnet so that the sound is associated with shutter movement rather than just actuation of the electromagnet. The movement of the speaker relative to the permanent magnet may be from a magnet fixed to a shutter that slides relative to a speaker fixed to the guide or the alternative of a magnet fixed to the guide that slides relative to a speaker fixed to the shutter and/or shutter slider. As an example, the rotating magnet may pass relative to the speaker to cause the sound. In one embodiment, an electric current associated with the moving magnetic fields may be used as an input to a GPIO of a processing resource of the camera circuit board to provide logical feedback of the shutter movement.

Figure 12:
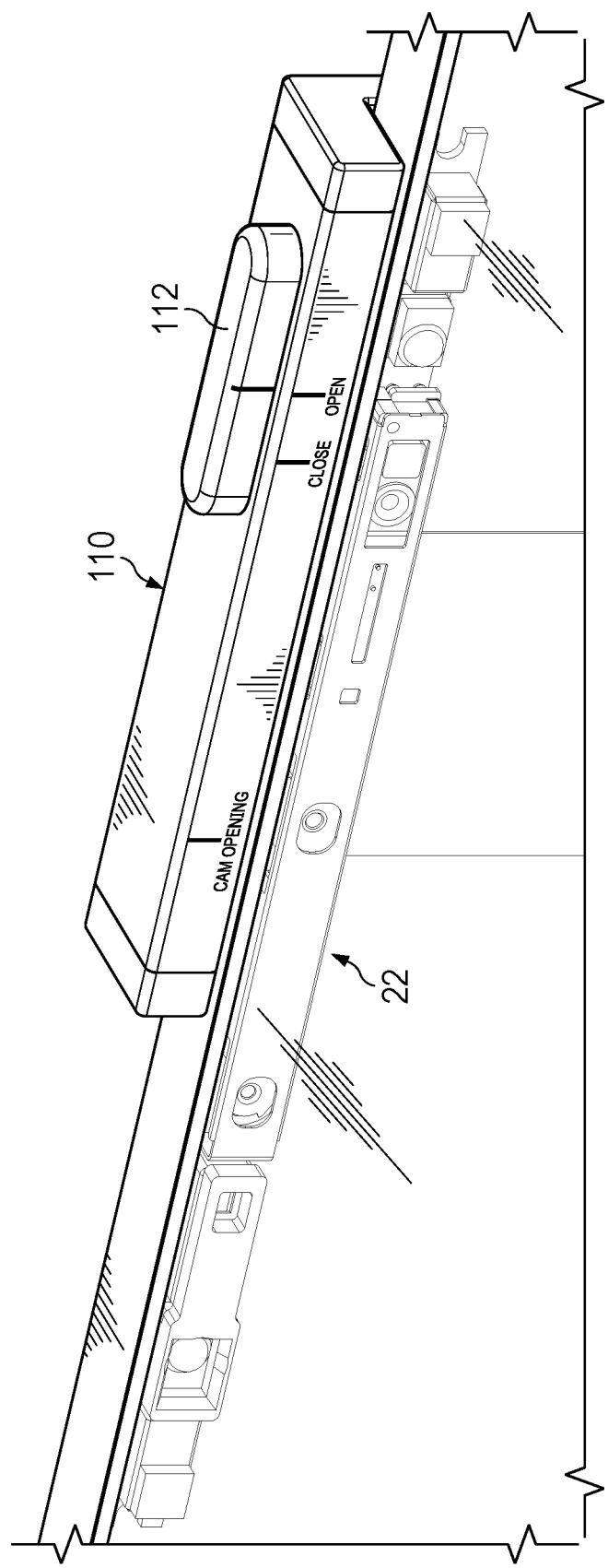
Figure 12B:
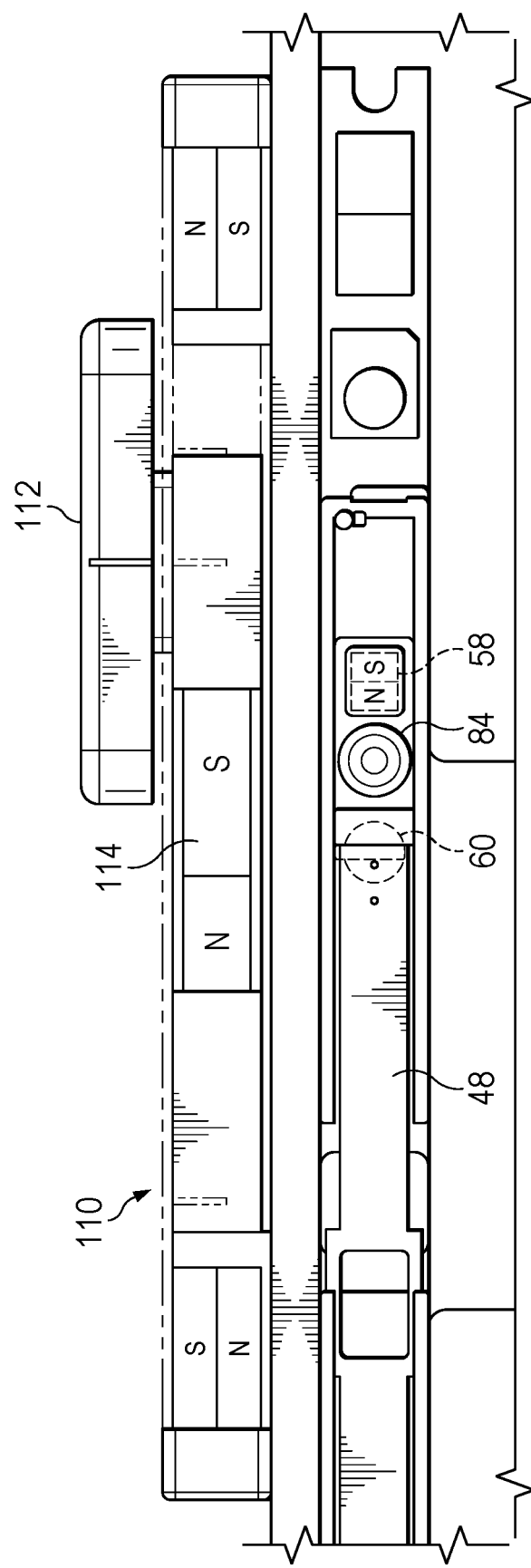

Referring now to FIGS. 12, 12A and 12B, a manual override device 110 is depicted that interacts with magnets of the shutter from manual movement between open and closed positions. Manual override device 110 rests on the upper side of the information handling system lid housing portion over display panel 20 with an exposed sliding handle 112 and an internal set of magnets 114. When sliding handle 112 slides relative to the housing, the magnet 114 moves internally to interact with the magnets of the shutter assembly and slide the shutter between the open and closed positions. FIG. 12A depicts the manual sliding handle 112 in an open position with the shutter 48 open to expose the camera. The north polarity of magnet 114 aligns with rotating magnet 60 to rotate to the unlock position while the south pole of magnet 114 aligns with the north pole of shutter slider magnet 58 near speaker 84. FIG. 12B depicts manual sliding handling 112 slid left so that the magnet 114 pulls shutter slider magnet 58 to close shutter 48 and also rotate rotating magnet 60 to the locked position. At initial setup when manual override device 110 is place on the lid housing portion, the magnets automatically align to achieve correct coupling. In the example embodiment, an alignment indicator is provided that shows camera alignment with camera opening.

Referring now to FIG. 13, an exploded perspective view depicts the manual override device 110 configured to interact with the shutter assembly magnets. An aluminum extruded chassis 120 is enclosed on opposing ends by end caps 122 that contain magnets 124 to couple the override device to an information handling system housing. Chassis 120 has an extend rear side that forms an L-shape to rest over the edge of the information handling system housing. A main sliding body 118 slides into chassis 120 and a member 126 extends up and through a slot of chassis 120 to couple with sliding handle 112. Main magnets 114 have a sufficient magnetic field to couple with the shutter magnets in the shutter assembly. A smaller set of facilitation magnets 116 are disposed on alternative sides of main magnets 114 to help facilitate sliding movement, such as by increased attraction as the facilitation magnets slide into proximity with the end cap 122 magnets 124. In one embodiment, rotation of the magnet 68 in the manual sliding operation may be detected by the camera circuit board as the power circuit to the camera opens and closes.

Although the present invention has been described in detail, it should be understood that various changes, substitutions and alterations can be made hereto without departing from the spirit and scope of the invention as defined by the appended claims.

What is claimed is:

1. An information handling system comprising:
a housing;
a processor disposed in the housing and operable to execute instructions to process information;
a memory disposed in the housing and interfaced with the processor, the memory operable to store the instructions and information;
an embedded controller interfaced with the processor and operable to manage operating conditions in the housing;
a camera module included in the housing, the camera module having a camera and a shutter assembly to selectively block and expose a field of view of the camera; and
an external shutter actuator separate from the housing and operable to rest on the housing to magnetically engage with the shutter assembly to slide the shutter assembly in response to sliding of the external shutter actuator;
wherein the shutter assembly comprises:
a guide;
an internal shutter actuator coupled to the guide and including an electromagnet;
a shutter engaged with the guide to slide between first and second positions;
a shield coupled to the guide over the shutter;
a slider plate coupled to the shutter and the guide and configured to slide in the guide to move the shutter between the first and second positions; and
a magnet coupled to the slider plate and positioned to move the slider plate in the guide in response to a magnetic field of the internal shutter actuator electromagnet.

2. The information handling system of claim 1 wherein the external shutter actuator magnetically engages with the magnet coupled to the slider plate.

3. The information handling system of claim 2 wherein the camera module further comprises a visual camera operable to capture visual images and an infrared camera operable to capture infrared images.

4. The information handling system of claim 2 further comprising a magnetic stop coupled to the guide and positioned to engage the slider plate when rotated to a first position and to disengage when rotated to a second position, the magnetic stop rotating between the first and second positions in response to the magnetic field of the electromagnet.

5. The information handling system of claim 4 wherein the external shutter actuator interacts with the magnetic stop to rotate the magnetic stop to a first position when the shutter blocks the field of view and a second position when the shutter exposes the field of view.

6. The information handling system of claim 5 wherein power to the camera passes through the magnetic stop in the second position and is cut off from passing through the magnetic stop in the first position.

7. The information handling system of claim 1 wherein:
the camera module includes a visual camera and an infrared camera;
the shutter moves only between the first and second positions; and the first position exposes both the visual camera and the infrared camera through the shield; and
the second position blocks both the visual camera and the infrared camera with the shutter.

8. A method for actuation of a shutter of a camera in an information handling system, the method comprising:
resting an external shutter actuator on the information handling system proximate the camera;
moving a member extending from the external shutter actuator relative to the camera to slide a magnet within the external shutter actuator;
coupling a shutter magnet to the shutter within the information handling system;
moving the shutter by applying a magnetic field of an electromagnet to the shutter magnet;
magnetically engaging the shutter magnet with the magnet to slide the shutter within the information handling system between blocked and unblocked positions;
coupling both a visual camera and an infrared camera in a camera module;
configuring the shutter to move only between first and second positions;
exposing both the visual camera and the infrared camera in the first position;
blocking both the visual camera and the infrared camera in the second position;
interfacing power to the visual camera through a rotational member of the shutter with first and second of spring biased connectors; and
rotating the rotational member to disconnect power of the first and second spring biased connectors through the rotational member.

9. The method of claim 8 further comprising:
rotating the rotational member to interface power in the shutter first position; and
rotating the rotational member to disconnect power in the shutter second position.

10. The method of claim 8 further comprising:
coupling the external shutter actuator to the information handling system with first and second sets of magnets coupled disposed in opposing ends of the external shutter actuator.

11. The method of claim 10 further comprising:
forming an alignment mark on the external shutter actuator to indicate alignment with the camera.

12. A camera module comprising:
a visual camera;
an infrared camera;
a circuit board, the visual camera and infrared camera affixed to the circuit board;
a shutter assembly having an internal shutter actuator operable to slide a shutter between a first position that blocks both the visual camera and the infrared camera and a second position that exposes both the visual camera and the infrared camera; and
an external shutter actuator operable to magnetically engage with the shutter assembly to slide the shutter assembly in response to sliding of the external shutter actuator;
wherein the internal shutter actuator comprises:
an electromagnet interfaced with the circuit board;
a guide;
a slider plate coupled to the shutter and the guide and configured to slide in the guide to move the shutter between the first and second positions; and a magnet coupled to the slider plate and positioned to move the slider plate in the guide in response to a magnetic field of the electromagnet;

wherein the external shutter actuator magnetically engages with the shutter magnet.

13. The camera module of claim 12 wherein the electromagnet comprises a voice coil motor coupled in the guide.

14. The camera module of claim 13 wherein the slider plate has one opening and an end distal the slider plate, the opening aligned with the visual camera in the second position, the end extending over the infrared camera in the first position.

* * * * *